United States Patent
Oliveira et al.

(10) Patent No.: US 10,302,953 B2
(45) Date of Patent: May 28, 2019

(54) ADJUSTABLE HEAD-UP DISPLAY ARRANGEMENT FOR A VEHICLE

(71) Applicant: VOLVO TRUCK CORPORATION, Göteborg (SE)

(72) Inventors: Roberson Oliveira, Curitiba (BR); Eric Dutt, Torslanda (SE); Christian Larsson, Kållered (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/777,749

(22) PCT Filed: Dec. 11, 2015

(86) PCT No.: PCT/EP2015/079484
§ 371 (c)(1),
(2) Date: May 21, 2018

(87) PCT Pub. No.: WO2017/097382
PCT Pub. Date: Jun. 15, 2017

(65) Prior Publication Data
US 2018/0335634 A1    Nov. 22, 2018

(51) Int. Cl.
*G02B 27/01* (2006.01)
*G09G 3/02* (2006.01)
*B60K 35/00* (2006.01)

(52) U.S. Cl.
CPC ..... *G02B 27/0179* (2013.01); *G02B 27/0101* (2013.01); *G02B 27/0149* (2013.01); *G09G 3/02* (2013.01); *B60K 35/00* (2013.01); *B60K 2350/2052* (2013.01); *B60K 2350/2065* (2013.01); *G02B 2027/0141* (2013.01);
(Continued)

(58) Field of Classification Search
CPC ............ G02B 27/0179; G02B 27/0149; G02B 27/0101; G02B 2027/0181; G02B 2027/0183; G02B 2027/0141; G02B 2027/0159; G02B 2027/0185; G09G 3/02; G09G 2380/10; G09G 2320/068; G09G 2340/0492; B60K 2350/2052; B60K 2350/2065; B60K 35/00
See application file for complete search history.

(56) References Cited

U.S. PATENT DOCUMENTS 4,624,536 A    11/1986   Nakagawa
5,519,539 A    5/1996    Hoopman et al.
(Continued)

FOREIGN PATENT DOCUMENTS

CN    103995355 A       8/2014
JP    11119147 A   *    4/1999
(Continued)

OTHER PUBLICATIONS

International Search Report (dated Aug. 23, 2016) for corresponding International App. PCT/EP2015/079484.

*Primary Examiner* — Jwalant Amin
(74) *Attorney, Agent, or Firm* — WRB-IP LLP (57) ABSTRACT

An adjustable head-up display (HUD) arrangement for a vehicle is provided that may be, for example, suitable for tuning a perceived distance to projected information based on a current speed and application type of the vehicle. A corresponding method for operating the HUD and to a related computer program product are also provided.

15 Claims, 4 Drawing Sheets

(52) U.S. Cl.
CPC ........ *G02B 2027/0159* (2013.01); *G02B 2027/0181* (2013.01); *G02B 2027/0183* (2013.01); *G02B 2027/0185* (2013.01); *G09G 2320/068* (2013.01); *G09G 2340/0492* (2013.01); *G09G 2380/10* (2013.01)

(56) References Cited

U.S. PATENT DOCUMENTS

| | | | |
|---|---|---|---|
| 5,646,639 A * | 7/1997 | Koie | G02B 27/01 340/920 |
| 6,204,976 B1 * | 3/2001 | Nagahara | G02B 15/177 359/683 |
| 2008/0285138 A1 | 11/2008 | Lebreton | |
| 2014/0160012 A1 * | 6/2014 | Su | G06F 3/005 345/156 |
| 2014/0234458 A1 | 8/2014 | Dierkes | |

FOREIGN PATENT DOCUMENTS

| | | | | |
|---|---|---|---|---|
| JP | H11119147 A | 4/1999 | | |
| KR | 20120011228 A | 2/2012 | | |
| WO | 2919961272 A1 | 6/2010 | | |
| WO | WO-2012007305 A1 * | 1/2012 | ........ | G02B 7/1821 |

\* cited by examiner

ADJUSTABLE HEAD-UP DISPLAY ARRANGEMENT FOR A VEHICLE

BACKGROUND AND SUMMARY

The invention relates to an adjustable head-up display (HUD) arrangement for a vehicle, for example suitable for tuning a perceived distance to projected information based on a current speed and application type of the vehicle. The invention also relates to a corresponding method for operating the HUD and to a thereto related computer program product.

In a modern ground vehicle there is a multitude of in that may be provided to a driver. Such information may for example include the current vehicle speed, the engine rotational speed, fuel level or the oil temperature, as well as traffic and navigation data or even display from different smartphone app information. The information is usually displayed on an instrument panel. When reading the displayed information from the instrument panel the driver is distracted at least for a short time from the traffic situation. Head-up displays (HUDs) make it possible to display graphical information, such as by means of a virtual image, directly in the field of view of the driver on the windshield of the vehicle or using a transparent media placed in front of it. In this way, information content provided with the virtual image can be comprehended while the road conditions remain in the driver's field of view.

For achieving a desirable driver ease in viewing the viewing image, it is generally a necessity to be able to adjust the position of the virtual image about its nominal position the better to adapt it to the height of the driver's seat, to his height and to the geometry of the vehicle. As exemplified in U.S. Pat. No. 5,034,732, also a vehicle context will have impact on how the virtual image is to be displayed to the driver. For example, the driver's eye direction is different between when the vehicle is running, in a city at low speed and when running on a speedway at high speed. In U.S. Pat. No. 5,504,732, this is handled using a half mirror reflecting means that is controlled as to its height and angular positions. The control is performed automatically based on a sensor detecting the speed of the vehicle.

Even though U.S. Pat. No. 5,034,732 discloses an interesting technical implementation for dynamically taking into account also contextual aspects in operating a vehicle, the suggested implementation will be somewhat bulky and not suitable for a modern type vehicle compartment having high constrains on available space. In addition, there would be desirable to allow for further flexibility in displaying a virtual image to a driver of a vehicle, specifically for commercial vehicles such as trucks and buses.

According to an aspect of the invention, the above is at least partly alleviated by a head up (HUD) display arrangement for a vehicle having a windshield, comprising a combiner, the combiner embedded on or arranged in a vicinity of the windshield, and a projector optically connected to said combiner, said projector projecting graphical information on said combiner, the graphical information perceived at a graphical information distance in front of the combiner, wherein the head-up display arrangement further comprises a lens arrangement arranged in an, optical path between the projector and the combiner, the lens arrangement comprising a plurality of axially aligned lenses, wherein at least one of the plurality of lenses is axially movable along the optical path for automatically adjusting said graphical information distance.

The present inventors have identified that it is desirable to be able to adjust not only the horizontal and vertical sight angles as has been proposed by means of previously known HUDs, but also allow for an adjustability of a perceived distance to the graphical information provided at the windshield. This is specifically apparent in a commercial vehicle, such as a tack or a bus, where the driver is arranged in an elevated position as compared to a passenger car. Mat is, the driver will greatly change his line of sight depending on the speed and the context of operating the vehicle. Thus, there will be a relatively large difference in focal) distance to the projected graphical information.

In accordance to the invention, the adjustability of the perceived distance, denoted as graphical information distance, is achieved using a flexible lens arrangement comprising a plurality of axially aligned lenses that may be repositioned along an optical path. The proposed lens arrangement may be implemented in a compact manner, thus making it advantageous for use in relation to a modern vehicle compartment. The repositioning may be performed dynamically and fast, thus allowing for an improved flexibility to handle quick changes in e.g. speed and context. Furthermore, the introduced flexibility makes it possible to swiftly position the graphical information at an angle that is slightly lower or higher than an "object of interest" visible through the windshield, as not to hide the object and its immediate surroundings. In an embodiment the context for the driver is dependent on a driver state monitoring (DSM) system arranged to monitor the behavior of the driver. The output from the DSM system may then be used as an input for controlling the graphical information distance.

The combiner may, as indicated above, be provided as an integral part of the windshield (possibly being a front, side or back window, typically being a front window) or as a separate part arranged close to the windshield. The combiner can be formed as a semi-reflective mirror (flat or curved) or diffractive combiner (i.e. a combiner that deviate the light towards the user by means of an optical diffraction grating). The combiner may for example be made from a glass or a plastics material.

In an embodiment of the invention, the lens arrangement comprises at least three lenses, including a fixed lens and at least a first and a second axially movable lens. The first and a second axially movable lens may typically be positioned to control a focal distance of the graphical information projected onto the combiner. An electronically controlled actuator, such as a motor, may be provided with each of the first and a second axially movable lens, allowing for axial reposition of the respective lenses.

In a preferred embodiment, at least seven lenses are provided with the lens arrangement, including three fixed lenses and four axially movable lenses. The further lenses (i.e. as compared to the previously mentioned three lenses) allows for an even further tuning of the focal distance, at the same time making easier to apply to the physical size constrains as mentioned above. That is, using an increased plurality of lenses allows for only small movements to be needed for achieving the desired adjustment of the focal distance and thus the resulting graphical information distance.

Preferably, the lens arrangement is configured such that it is possible to allow the graphical information distance to be adjusted at least between 2 and 8 meters. The exemplified distance range is of course dependent on the specific implementation, type of vehicle, etc. and may hence result in a wider or narrower distance range. However, in case of allowing the graphical information distance to be adjusted to between 2 and 8 meters it is typically possible to handle typical speed and contextual scenarios for the vehicle. It should be understood that the graphical information distance also may, as indicated above, be adjusted based on an elevated height of a driver compartment of the vehicle in relation to a ground level.

In a possible embodiment of the invention the lens arrangement is configured to be constantly adjusted by axially moving the at least one lens along the optical path, typically with a frequency at or above 30 Hz. By means of allowing such control the graphical information distance may be set dynamically, typically suitable for an augmented reality application where the provided graphical information is matching the location of real-world information actually viewed by the driver, for example in various driving environments.

The projector preferably comprises at least one of a laser scanning display and au image projection device. The laser scanning display is typically implemented using microelectromechanical system (MEMS) technology or any other light steering module, allowing for low energy consumption. However, it should be understood that any type of suitable technology may be used for generating the graphical information.

In a preferred embodiment the head-up display further comprises a control unit electrically connected to the actuator/motor of the lens arrangement for automatically adjusting the graphical information distance. The control unit may typically be arranged to receive information relating to the speed of the vehicle, the elevated height of the driver compartment, information relating to obstacles such as other vehicles, pedestrians, and road defect, and control the graphical information distance based on the received information. The control unit may for example be connected to an ECU/ECM (Electronic. Control Unit/Engine Control Module), where the ECU/ECM is comprised with the vehicle.

In an embodiment the graphical information to be projected includes at least one of an image and a video. The image/video may include information providing at least one of guidance and a warning to a driver of, the vehicle. Other information as discussed above, e.g. current vehicle speed, the rotational speed of an engine comprised with the vehicle, the fuel level, and traffic/navigation data may be projected on the combiner and thus displayed to the driver of the vehicle. Providing a warning or relevant information to the driver has been identified as specifically advantageous. In addition, by using the disclosed HUD arrangement, it may also be possible to provide e.g. driver coaching information provided from vehicles or infrastructure within the vicinity (V2V, V2I), information relating to a platooning scenario (typically for trucks), etc.

In a preferred embodiment of the invention, the head-up display is comprised as a component of the vehicle. The vehicle could be any type of ground vehicle, for example a truck, a car, a bus, any type of construction vehicles/equipment, any type of war vehicles, a motorcycle, etc.

According to another aspect of the present invention there is provided a method for operating a head-up display arrangement for a vehicle having a windshield, the head-up display arrangement comprising a combiner, the combiner embedded on or arranged in a vicinity of or embedded on the windshield, a projector optically connected to said combiner, said projector projecting graphical information on said combiner, the graphical information perceived at a virtual distance in front of the combiner, and a lens arrangement arranged in an optical path between the projector and the combiner, the lens arrangement comprising a plurality of axially aligned lenses wherein the method comprises determining a vehicle related parameter, and adjusting an operational parameter for the head-up display arrangement based on the vehicle related parameter, wherein the vehicle related parameter comprises at least one of speed of the vehicle, a vehicle operational condition, and an operational condition for a driver of the vehicle, and the operational parameter for the head-up display arrangement comprises at least one of the graphical information distance and a view angle. This aspect of the invention provides similar advantages as discussed above in relation to the previous aspect of the invention.

According to a still further aspect of the present invention there is provided a computer program product comprising a computer program product comprising a computer readable medium having stored thereon computer program means for operating a head-up display arrangement for a vehicle, the head-up display arrangement comprising a combiner arranged in a vicinity of a windshield of the vehicle, a projector optically connected to said combiner, said projector projecting graphical information on said combiner, the graphical information perceived at a virtual distance in front of the combiner, and a lens arrangement arranged in an optical path between the projector and the combiner, the lens arrangement comprising a plurality of axially aligned lenses wherein the computer program product comprises code for determining a vehicle related parameter; and code for adjusting an operational parameter for the head-up display arrangement based on the vehicle related parameter, wherein the vehicle related parameter comprises at least one of speed of the vehicle, a vehicle operational condition, and an operational condition for a driver of the vehicle, and the operational parameter for the head-up display arrangement comprises at least one of the graphical information distance and a view angle. Also this aspect of the invention provides similar advantages as discussed above in relation to the previous aspects of the invention.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

The present invention will now be described more fully hereinafter with reference to the accompanying drawings, in which currently preferred embodiments of the invention are shown. This invention may, however, be embodied in many different firms and should not be construed as limited to the embodiments set forth herein; rather, these embodiments are provided for thoroughness and completeness, and fully convey the scope of the invention to the skilled addressee. Like reference characters refer to like elements throughout.

Figure 1A:
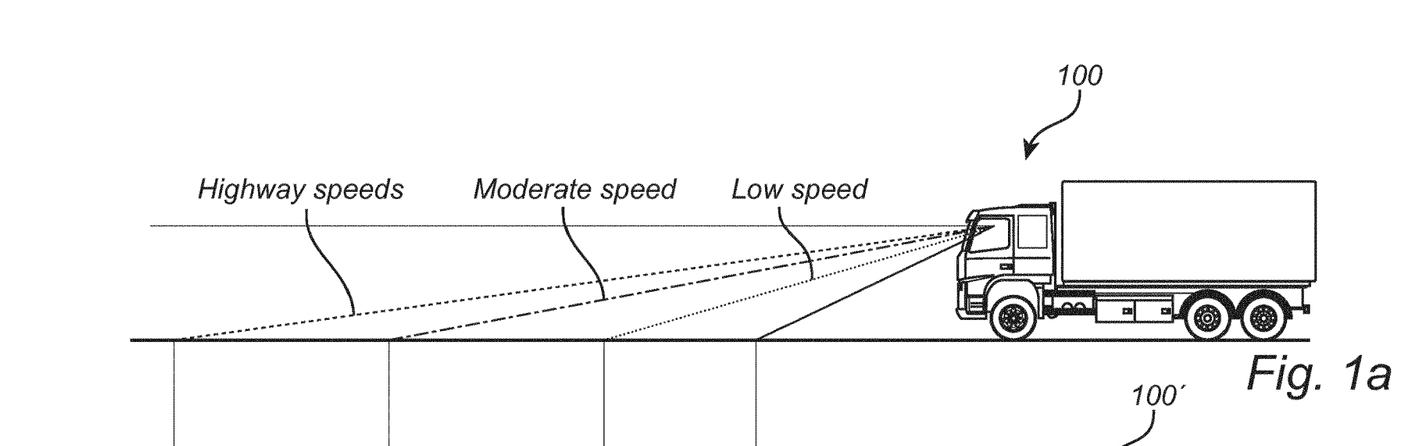
FIGS. 1a and 1b illustrate a truck and a passenger car, respectively, comprised with a head-up display (HUD) arrangement according to a currently preferred embodiment of the invention.
Figure 1B:
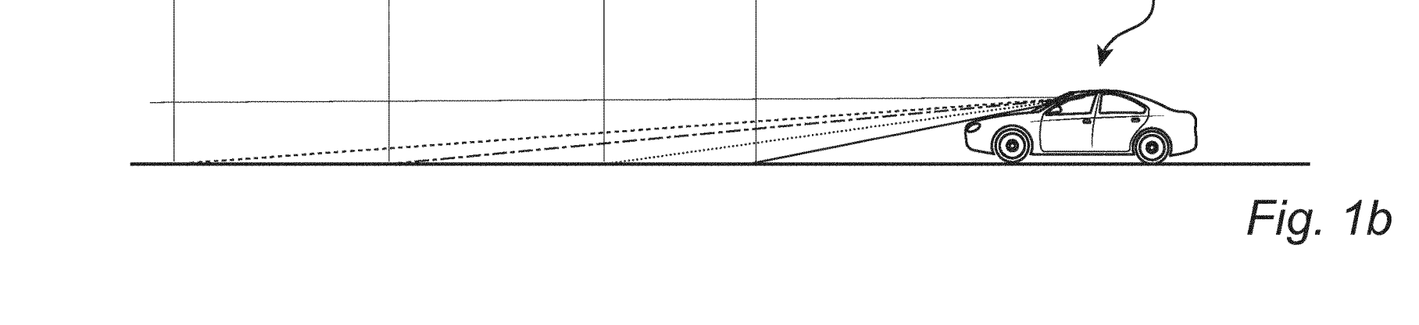

Referring now to the drawings and to FIGS. 1a and 1b in particular, there is in FIG. 1a depicted an exemplary vehicle, here illustrated as a truck 100, in which the adaptive HUD according to the present invention may be incorporated. The inventive concept may of course also be implemented, possibly in a slightly different way, in a car 100', as shown in FIG. 1b.

As has been discussed above and will be further elaborated below, the concept according to the invention allows for adjustability of horizontal and vertical viewing angles as well as fit changing a perceived distance to the graphical information projected onto a combiner arranged at the windshield of the vehicle. From reviewing FIGS. 1a and 1b, it will be readily understood that driver will greatly change his line of sight depending on the speed and the context of operating the vehicle. Thus, there will be a relatively large difference in focal distance to the projected graphical information, typically depending on speed and a general operational situation surrounding the vehicle. Thus, allowing for an adjustability of the angle and the perceived graphical information distance to the projected graphical information would greatly improve ergonomics, and thus safety, fir a driver of the vehicle.

It should be understood that the graphical information distance is defined as a distance between a viewing eye box for the driver of the vehicle and the perceived position of the projected graphical information, referred to interchangeably as a virtual image. It is desirable to define a relatively large eye box, readily accommodating the driver's eye and head movements and mirror reposition when driving the vehicle.

Figure 2:
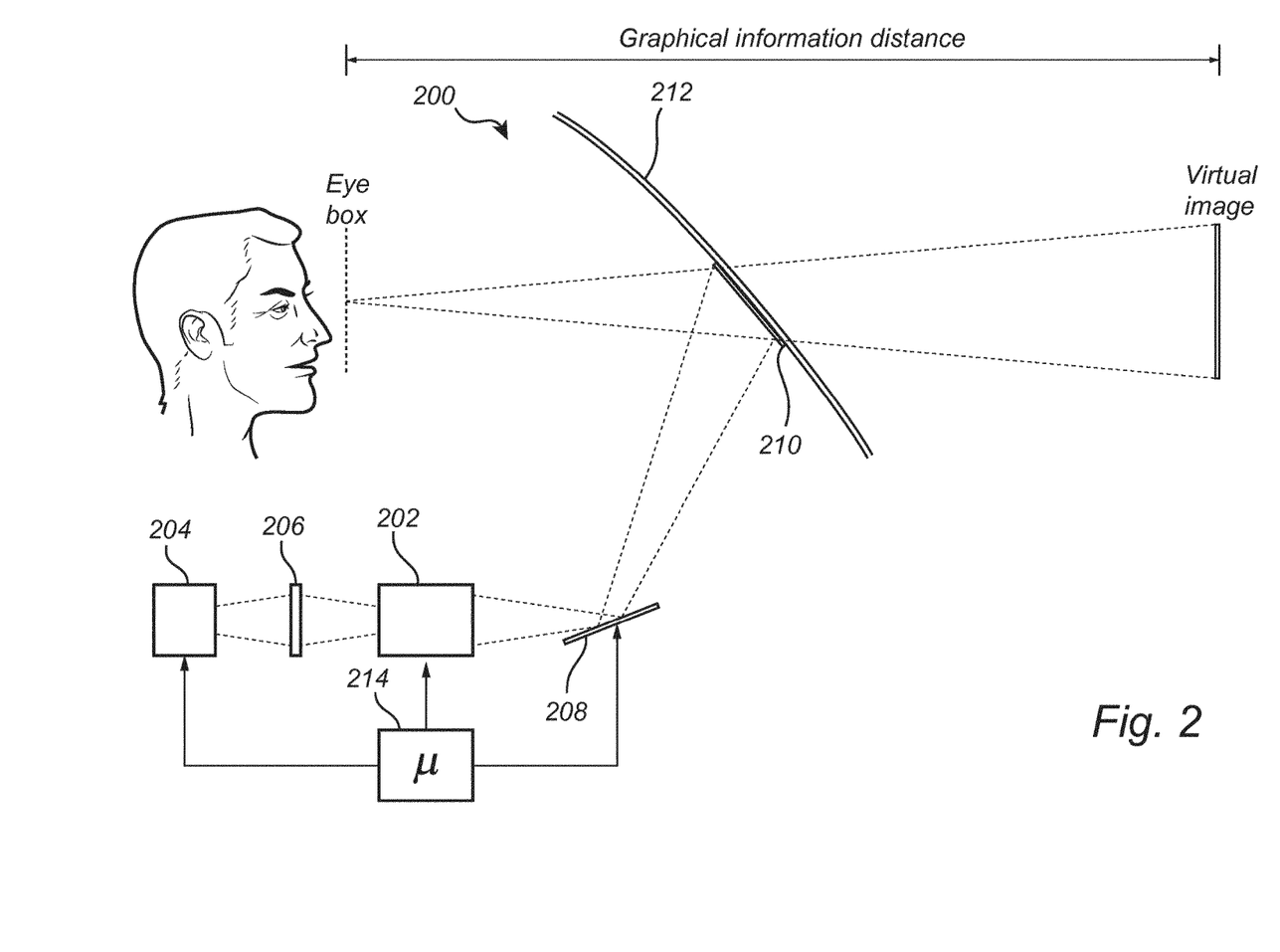
FIG. 2 conceptually shows the principle of the HUD arrangement according to an embodiment of the invention.

With further reference to FIG. 2, there is provided a conceptual illustration of an adaptive HUD arrangement 200 according to the present invention, provided with a lens arrangement 202 configured for allowing tuning of the perceived distance, i.e. the graphical information distance, to the graphical information presented to the driver of the vehicle. The HUD arrangement 200 also comprises a projector 204, in the form of a light or laser engine, configured to project light onto a screen surface, also termed as an exit pupil expander (EPE) 206. The EPE 206 is typically a diffuser plate placed at an adequate distance from the projector 204 to achieve a desired image size. The EPE 206 is typically several centimeters on the diagonal and viewed by the driver due to the alignment of a folding mirror 208 which makes it visible "through" a combiner 210 embedded with a windshield 212 of the vehicle. The combiner 210 may as an alternative be provided as a separate combiner plate arranged in the vicinity of the windshield 212. Possibly, the windshield 212 may as an alternative be provided with a transparent emissive fluorescent film acting as the combiner 210 and for projecting the graphical information.

The lens arrangement 202 is arranged in an optical path between the EPE 206 and the folding mirror 208. The lens arrangement 202 comprises a plurality of axially aligned lenses, wherein at least one of the lenses is axially movable along the optical path. It should be emphasized that any remaining lens(es) out of the plurality of lenses comprised with the lens arrangement 202 will be arranged in a fixed position, i.e. in relation to the at least one axially movable lens. The plurality of lenses may for example include a set of lenses to achieve both a larger virtual image size as well as for changing the perceived graphical information distance between the driver and the virtual image 212. Motors/actuators are provided with the lens arrangement 202 for automated movement of the at least one of the lenses along the optical path.

The EPE 206 may in some embodiments include an ordered array of microstructures or a randomized light diffuser. The EPE 206 may also include a micro lens array (MLA), for example manufactured from a molded liquid polymer, or may be formed via other methods.

The projector 204 is arranged to create the necessary light with a monochrome or multicolor content for the projection, for example being including a MEMS-based laser-scanning light engine. The projector 204 is preferably arranged in a housing together with the lens arrangement 202. The projector 204 may further be arranged to adapt the size of the projected image, e.g. using a graphics controller of the projector 204. It should be understood that any type of standard picture generation unit (PGU) may be used as the projector 204, including for example TFT, LCD, LED displays.

The HUD arrangement 200 further comprises a control unit 214 in electrical communication with the motors/actuators provided with the lens arrangement 202, arranged to reposition the at least one of the plurality of lenses, e.g. dependent on a speed of the vehicle. The control unit 214 may be connected to e.g. a communication interface (such as e.g. a CAN bus or similar, or a dedicated communication interface). A present context for the vehicle, e.g. relating to a current speed, surrounding vehicles, pedestrians, etc. may be relayed to the control unit over the CAN bus from e.g. sensors provided with the truck. The control unit 214 may be provided as a separate unit and/or may at least partly form part of an electronic control unit comprised with the truck 100 or the car 100'.

The control unit 214 may include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3:
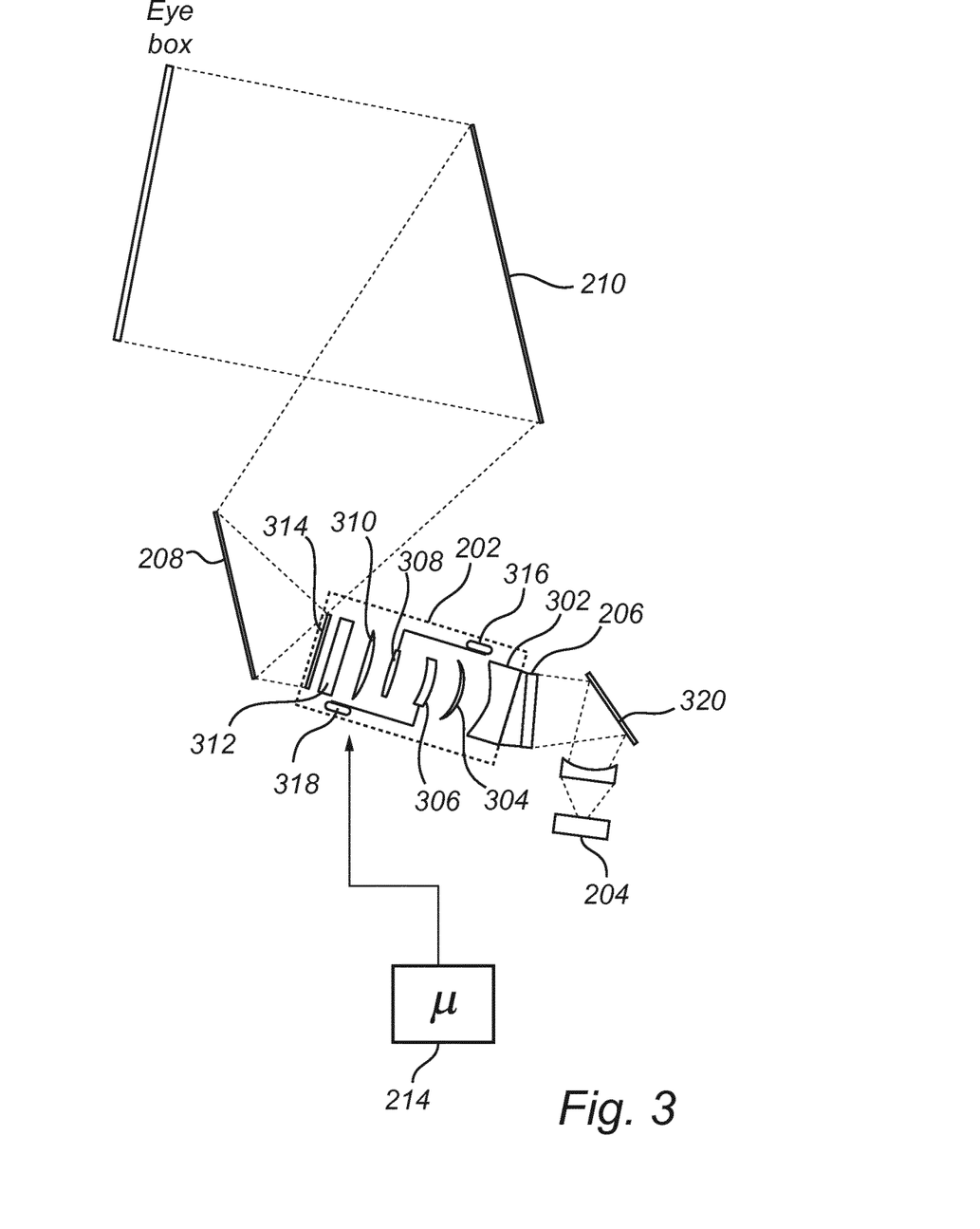
FIG. 3 details a further possible embodiment of the invention.

Turning now to FIG. 3, which provides a more detailed embodiment of the lens arrangement 202 further to the generic embodiment shown in FIG. 2. Specifically, the lens arrangement 202 is arranged to comprise seven lenses 302, 304, 306, 308, 310, 312 and 314. Four out of the seven lenses, i.e. lenses 304, 306, 308, 310, may be rearrangable in an axial manner, using the above mentioned actuators/motors. Accordingly, the lenses 302, 312 and 314 are arranged in a fixed "non-movable" manner. In a specific embodiment and as is shown FIG. 3, the four lenses 304, 306, 308, 310 may be arranged in two pairs, where every second of the four lenses 304, 306, 308, 310 forms a pair. The first pair of lenses may thus be arranged to include lenses 304 and 308, whereas the second pair of lenses may include lenses 306 and 310. Each of the first and the second pair of lenses may be individually controlled in relation to each other, using actuators/motors 316 and 318, respectively. As mentioned above, the actuators/motors 316 and 318 are electrically connected to the control unit 214, allowing a focal length of the lens arrangement 202 to be adjusted, and as a consequently the perceived distance to the virtual image. In addition, a mirror (that can be aspheric or plane) 320 is provided for redirecting the graphical information generated by the projector 204 and also affecting the field of view.

In a possible implementation of the invention, the lens arrangement may be arranged within a cavity of around 100 mm, allowing the lens arrangement 202 and thus the proposed HUD arrangement 200 to be flexibly installed in a vehicle. It should be understood that further lenses may be included with the lens arrangement 202, typically dependent on the packaging space available within the vehicle.

The combiner 210 may include powered optics allowing the projected image to be rotated, thus changing the view angle for the driver looking at the combiner 210. In case the combiner 210 is provided as a separate combiner plate, such an arrangement may possibly be tilted/rotated as desired for achieving a desired change in view angle. It is possible, and within the scope of the invention, to allow also a position of the folding mirror 208 to be adjustable, typically by the introduction of a further actuator/motor connected to the control unit 214. It should be understood that it is possible to include more than a single aspheric mirror 320 and more than a single folding mirror 208.

Figure 4:
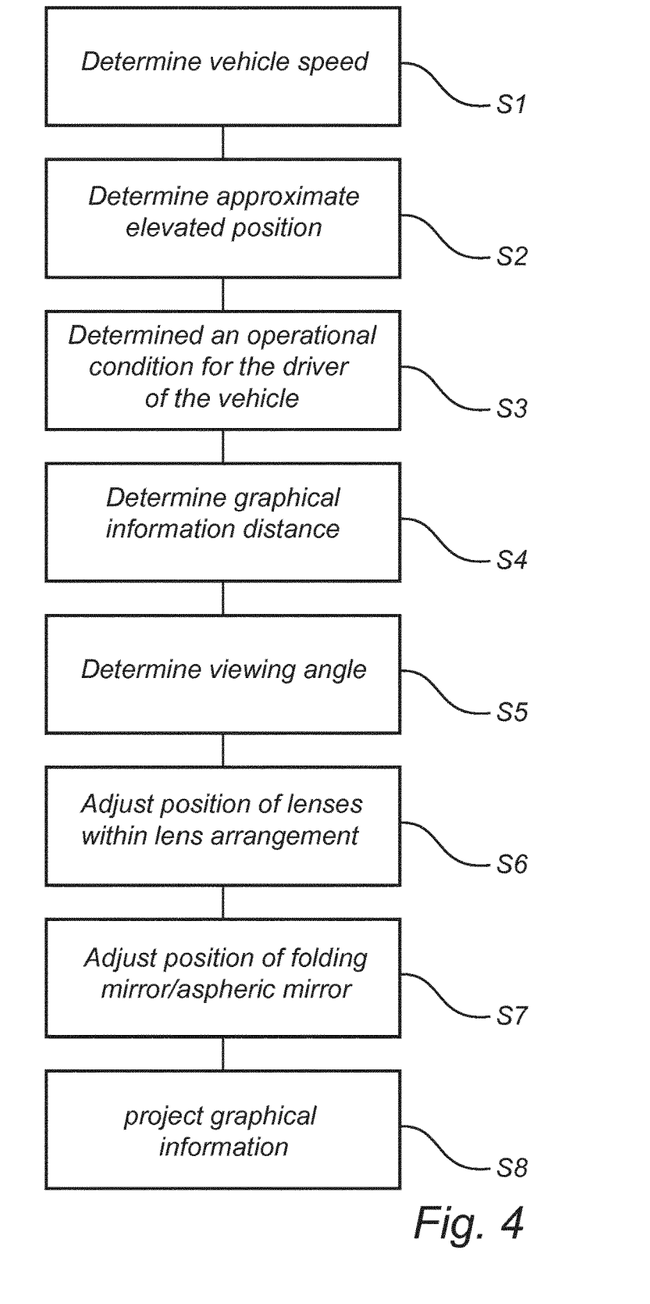
FIG. 4 illustrates the processing steps for performing the method according to the invention.

During operation of the adaptive HUD, with further reference to FIG. 4, the process may typically start by that the control unit 214 acquires information indicative of a vehicle related parameter. Such an acquisition may for example include determining. S1, a current speed of the vehicle, determining, S2, an approximate distance between the eyes of a driver of the vehicle and a ground level, and determining, S3, an operational condition for the driver of the vehicle. The operational condition for the driver may include information relating to a work load for the driver, for example dependent on further vehicles and/or pedestrians available in the surrounding of the vehicle. The driver state monitoring (DSM) system can also provide information to the control unit 214.

Based on the collected information, the control unit 214 adjusts an operational parameter for the HUD arrangement 200. Such an adjustment of the operational parameter typically result from determining, S4, the mentioned graphical information distance and determining, S5, viewing angle. Based on the determined graphical information distance and the viewing angle, the actuators/motors 316/318 of the lens arrangement 202 are activated to adjust, S6, the position of the first and the second set of lenses 3041308 and 306/310 respectively, for adjusting the graphical information distance. Also the actuators/motors provided with the folding mirror 208 and/or the aspheric mirror 320 may be activated for adjusting, S7, the vie vying angle.

In addition, the projector 204 is activated, S8, to project graphical information (virtual image) onto the combiner 210. The graphical information may typically be a static or dynamic image (video), providing at least one of guidance and a warning to the driver of the vehicle. Accordingly, the collected information is used for allowing positioning of the graphical information at an angle that is slightly lower or higher than objects that should not be hidden with the projected graphical information. The speed of the vehicle, surrounding objects (further vehicles, pedestrians), etc., all have an impact on where the graphical information is to be placed for achieving the best possible display/guidance.

In summary, the present invention relates to a head-up display arrangement for a vehicle having a windshield, comprising a combiner, the combiner embedded on or arranged in a vicinity of the windshield, and a projector optically connected to said combiner, said projector projecting graphical information on said combiner, the graphical information perceived at a graphical information distance in front of the combiner, wherein the head-up display arrangement further comprises a lens arrangement arranged in an optical path between the projector and the combiner, the lens arrangement comprising a plurality of axially aligned tenses, wherein at least one of the plurality of lenses is axially movable along the optical path for automatically adjusting said graphical information distance.

Advantages with the invention include the possibility of adjusting the perceived distance to the graphical information provided at the windshield, while keeping the implementation compact and suitable for a modern type vehicle compartment.

The present disclosure contemplates methods, systems and program products on any machine-readable medium for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable medium for carrying or having machine-executable instructions or data structures stored thereon. Such machine-readable medium can be any available medium that can be accessed by a general purpose or special purpose computer or other machine with a processor.

By way of example, such machine-readable medium can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable medium. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

Variations to the disclosed embodiments, can be understood and effected by the skilled addressee in practicing, the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A head-up display (HUD) arrangement comprised with a vehicle having a windshield, the head-up display (HUD) arrangement comprising:
    a combiner, the combiner embedded on or arranged in a vicinity of the windshield the vehicle,
    a projector optically connected to the combiner, the projector projecting graphical information on the combiner, the graphical information perceived by a driver of the vehicle at a graphical information distance in front of the combiner, and
    a lens arrangement arranged in an optical path between the projector and the combiner, the lens arrangement comprising a plurality of axially aligned lenses, wherein at least one of the plurality of lenses is axially movable along the optical path for automatically adjusting the graphical information distance,
wherein:
    the vehicle is a vehicle in which the driver is arranged in an elevated position as compared to a standard passenger car,
    the head-up display arrangement further comprises control unit in electrical communication with the lens arrangement for moving the plurality of lenses to adjust the graphical information distance,
    the graphical information distance is adjusted based on a type of the vehicle, a determination of a speed of the vehicle, and a determination of an elevated height of a driver compartment of the vehicle in relation to a ground level defining an approximate distance between the eyes of a driver of the vehicle and the ground level, and
    the combiner comprises powered optics controllable using the control unit for rotatably adjusting a view angle of the projected graphical information for the driver looking at the combiner.

2. The head-up display arrangement according to claim 1, wherein the lens arrangement comprises at least three lenses, including a fixed lens and at least a first and a second axially movable lens.

3. The head-up display arrangement according to claim 1, wherein the lens arrangement comprises at least seven lenses, including three fixed lenses and four axially movable lenses.

4. The head-up display arrangement according to claim 1, wherein the lens arrangement is configured to allow the graphical information distance to be adjusted to between 2 and 8 meters.

5. The head-up display arrangement according to claim 1, further comprising at least one step motor for axially moving the at least one of the plurality of lenses along the optical path.

6. The head-up display arrangement according to claim 1, wherein the projector comprises at least one of a laser scanning display and an image projection device.

7. The head-up display arrangement according to claim 1, further comprising a mirror and a folding mirror arranged in the optical path between the projector and the combiner.

8. The head-up display arrangement according to claim 1, wherein the graphical information distance is adjusted based on at least one of a vehicle operational condition, and an operational condition for a driver of the vehicle.

9. The head-up display arrangement according to claim 1, wherein a position of the folding mirror is adjustable.

10. The head-up display arrangement according to claim 1, further comprising a housing, wherein the projector and the lens arrangement are disposed in the housing.

11. The head-up display arrangement according to claim 1, wherein the graphical information comprises at least one of an image and a video.

12. The head-up display arrangement according to claim 1, wherein, graphical information is arranged to provide at least one of guidance and a warning to a driver of the vehicle.

13. The head-up display arrangement according to claim 1, wherein the vehicle type is at least one of a truck and a bus.

14. A method for operating a head-up display arrangement (HUD) for a vehicle in which the driver is arranged in an elevated position as compared to a standard passenger car, and having a windshield, the head-up display arrangement comprising:
    a combiner, the combiner embedded on or arranged in a vicinity of or embedded on the windshield of the vehicle,
    a projector optically connected to the combiner, the projector projecting graphical information on the combiner, the graphical information perceived by a driver of the vehicle at a graphical information distance in front of the combiner,
    a lens arrangement arranged in an optical path between the projector and the combiner, the lens arrangement comprising a plurality of axially aligned lenses, wherein at least one of the plurality of lenses is axially movable along the optical path for automatically adjusting the graphical information distance, and
    a control unit electrically connected to the lens arrangement for adjusting the graphical information distance by moving the plurality of lenses,
wherein the method comprises:
    determining a speed of the vehicle,
    determining an elevated height of a driver compartment of the vehicle in relation to a ground level defining an approximate distance between the eyes of a driver of the vehicle and the ground level;
    adjusting, using the control unit, the graphical information distance based on a type of the vehicle, the speed of the vehicle and the approximate distance between the eyes of the driver of the vehicle and the ground level, and
    adjusting, using the control unit a view angle of the projected graphical information for the driver looking at the combiner by rotatably adjusting the combiner using powered optics comprised with the combiner.

15. A non-transitory computer program product comprising a computer readable medium having stored thereon a computer program for operating a head-up display arrangement (HUD) for a vehicle in which the driver is arranged in an elevated position as compared to a standard passenger car, the head-up display arrangement comprising:

a combiner arranged in a vicinity of a windshield of the vehicle, a projector optically connected to the combiner, the projector projecting graphical information on the combiner, the graphical information perceived by a driver of the vehicle at a graphical distance in front of the combiner, a lens arrangement arranged in an optical path between the projector and the combiner, the lens arrangement comprising a plurality of axially aligned lenses, wherein at least one of the plurality of lenses is axially movable along the optical path for automatically adjusting the graphical information distance, and a control unit electrically connected to the lens arrangement for adjusting the graphical information distance by moving the plurality of lenses, wherein the computer program product comprises:

code for determining a speed of the vehicle, code for determining an elevated height of a driver compartment of the vehicle in relation to a ground level defining an approximate distance between the eyes of a driver of the vehicle and the around level;

code for adjusting, using the control unit the graphical information distance based on type of the vehicle, the speed of the vehicle and the approximate distance between the eyes of the driver of the vehicle and the ground level, and code for adjusting, using the control unit a view angle of the projected graphical information for the driver looking at the combiner by rotatably adjusting the combiner using powered optics comprised with the combiner.

\* \* \* \* \*